US009726962B1

United States Patent
Nalla et al.

(10) Patent No.: US 9,726,962 B1
(45) Date of Patent: Aug. 8, 2017

(54) ENHANCED CAMERA MODULE MOUNT

(71) Applicants: Ravi Nalla, San Jose, CA (US);
Michael Nikkhoo, Saratoga, CA (US);
Igor Markovsky, San Jose, CA (US)

(72) Inventors: Ravi Nalla, San Jose, CA (US);
Michael Nikkhoo, Saratoga, CA (US);
Igor Markovsky, San Jose, CA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 15/143,362

(22) Filed: Apr. 29, 2016

(51) Int. Cl.
G03B 17/56 (2006.01)
(52) U.S. Cl.
CPC .................. G03B 17/561 (2013.01)
(58) Field of Classification Search
None
See application file for complete search history.

(56) References Cited

U.S. PATENT DOCUMENTS

| 6,119,359 A | 9/2000 | Suzuki et al. |
| 7,031,083 B2 | 4/2006 | Chen |
| 7,484,901 B2 | 2/2009 | Seo et al. |
| 7,639,435 B2 | 12/2009 | Chiang |
| 7,974,528 B2 | 7/2011 | Chou |
| 8,542,451 B2 | 9/2013 | Lu et al. |
| 8,786,713 B1 | 7/2014 | Tamasanis |
| 8,988,602 B2 | 3/2015 | Speltz et al. |

| 2005/0173046 A1 | 8/2005 | Savoie et al. |
| 2013/0114153 A1* | 5/2013 | Lu ............ H04N 5/2257 359/819 |
| 2015/0124098 A1 | 5/2015 | Winden et al. |

FOREIGN PATENT DOCUMENTS

| WO | WO2013/191546 A1 | 12/2013 |
| WO | WO2014/026202 A2 | 2/2014 |

OTHER PUBLICATIONS

Bitzer, et al., "Active Alignment for Cameras in Mobile Devices and Automotive Applications", In Proceedings of 12th Electronics Packaging Technology Conference, Dec. 8, 2010, pp. 260-264.
Yoder, Paul R., "Mounting Optical Components", In OSA Handbook of Optics, Retrieved on: Oct. 31, 2015, 26 pages.

* cited by examiner

Primary Examiner — Rochelle-Ann J Blackman
(74) Attorney, Agent, or Firm — Scott Y. Shigeta; Newport IP, LLC

(57) ABSTRACT

The techniques disclosed herein provide an enhanced mount for a camera module. The mount comprises at least a first side and a second side. The sides are formed to enable contact with at least a portion of the camera module. The sides are configured with openings to enable a fastening material, such as an adhesive, to secure the camera module to the mount. Openings within the mount enable the use of a fastening material to secure the camera module to at least one surface of the mount while allowing the camera module and at least one surface to maintain the mechanical contact. In some configurations, one or more openings are formed such that a contraction of the fastening material pulls the camera module toward at least one surface of the mount.

18 Claims, 12 Drawing Sheets

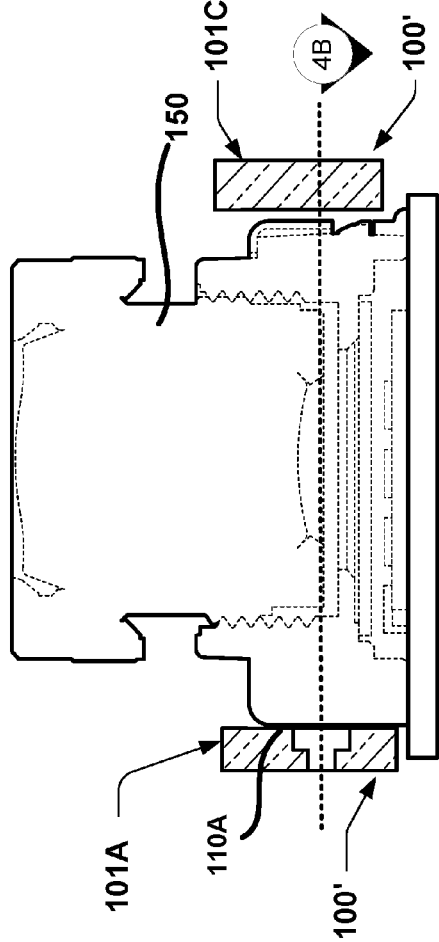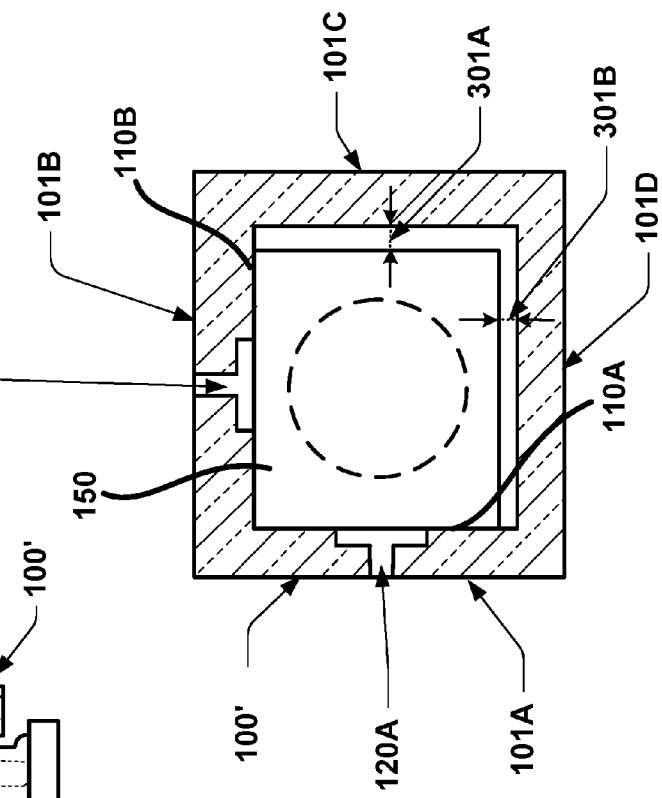

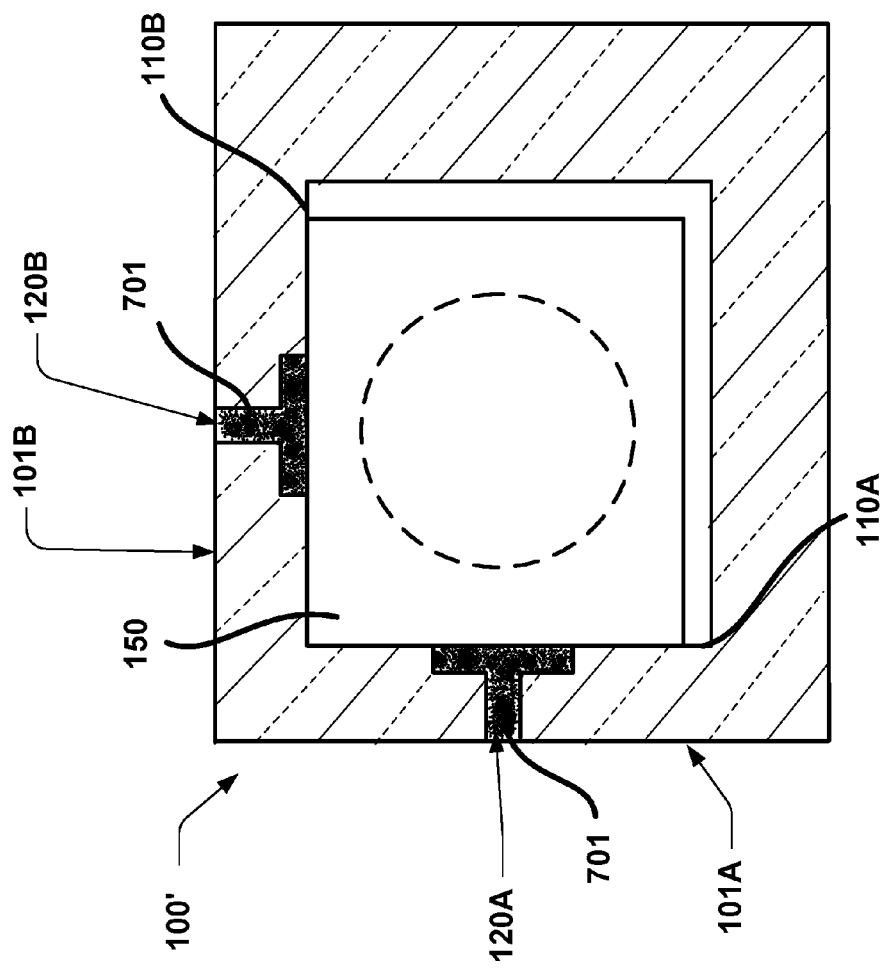

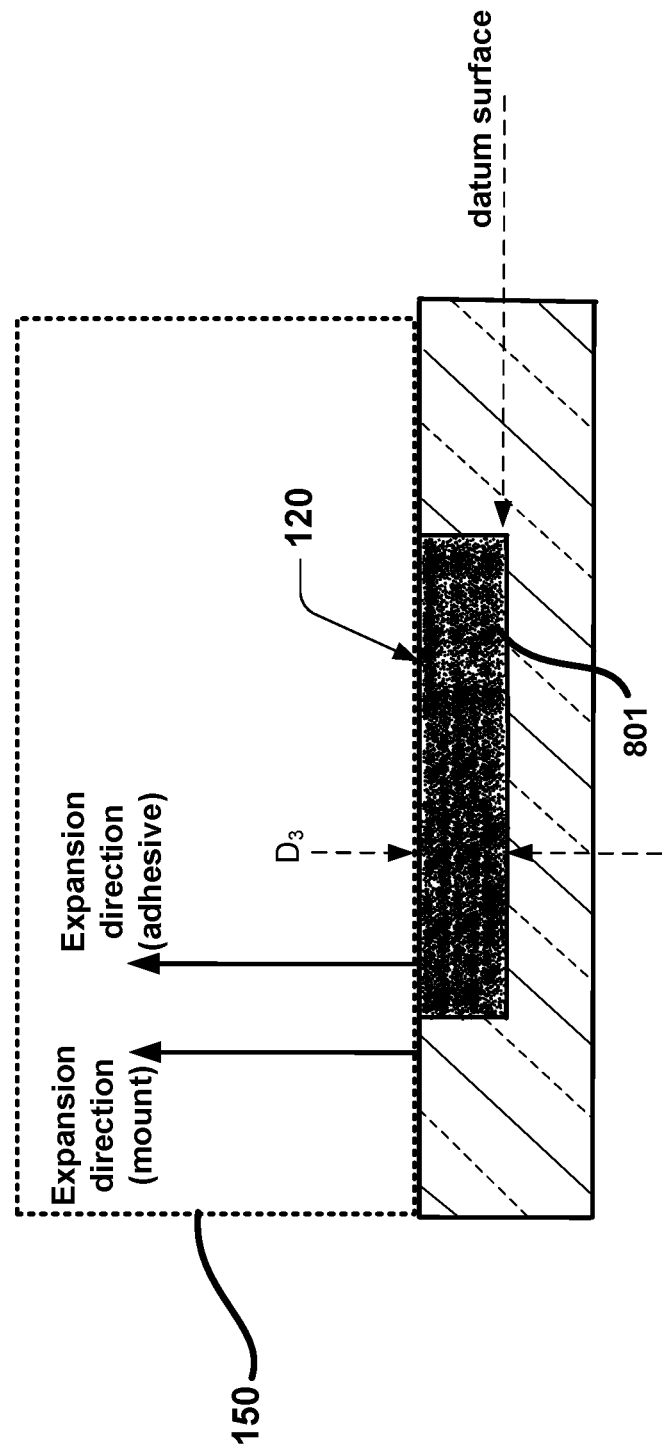

ENHANCED CAMERA MODULE MOUNT

BACKGROUND

With the continuous advancement of optical and computer technologies, electronic products such as imaging camera modules are in widespread use. Today, many different types of portable devices include an imaging camera module, which is also referred to herein as a camera module. The stability of the camera module within a device can be a key component to obtaining accurate, high quality image data. To improve the stability of a camera module within a device, some current designs utilize adhesives.

Although adhesives can be used to hold a camera module in place, there are a number of drawbacks with some current designs. In one example, some designs position an adhesive between a camera module and a mount. Thus, some designs create a situation where a camera module is substantially or fully supported by an adhesive, and a camera module can "float" within the adhesive. In such designs, an adhesive can displace the camera module during thermal cycling, an unintended result that can impact the quality of an image captured by the camera module, including but not limited to changes in the location of the field of view.

It is with respect to these and other considerations that the disclosure made herein is presented.

SUMMARY

The techniques disclosed herein provide an enhanced camera module mount. In some configurations, the mount comprises one or more sides configured to maintain contact with at least a portion of the camera module, before, during, and after the application of a fastening material, such as an adhesive. The sides comprise one or more openings to enable the application of the fastening material to secure the camera module to the mount. The openings within the mount enable the use of a fastening material to secure the camera module to at least one surface of the mount while allowing the camera module and at least one surface to maintain the physical contact. In some configurations, one or more openings are formed such that a contraction of the fastening material pulls the camera module toward at least one surface of the mount.

These and various other features will be apparent from a reading of the following Detailed Description and a review of the associated drawings. This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

BRIEF DESCRIPTION OF THE DRAWINGS

The Detailed Description is described with reference to the accompanying figures. In the figures, the left-most digit(s) of a reference number identifies the figure in which the reference number first appears. The same reference numbers in different figures indicates similar or identical items. References made to individual items of a plurality of items can use a specific reference number with a letter of a sequence of letters, and generic or individual references to the items may use the specific reference number without the sequence of letters.

FIGS. 3A and 3B include cross-sections of a mount and a camera module positioned therein;

FIGS. 6-7 illustrate aspects of a process for securing a camera module to a mount utilizing techniques disclosed herein;

FIG. 8D includes a cross-section of one side illustrating aspects of a mount and a fastening material.

DETAILED DESCRIPTION

Figure 1:
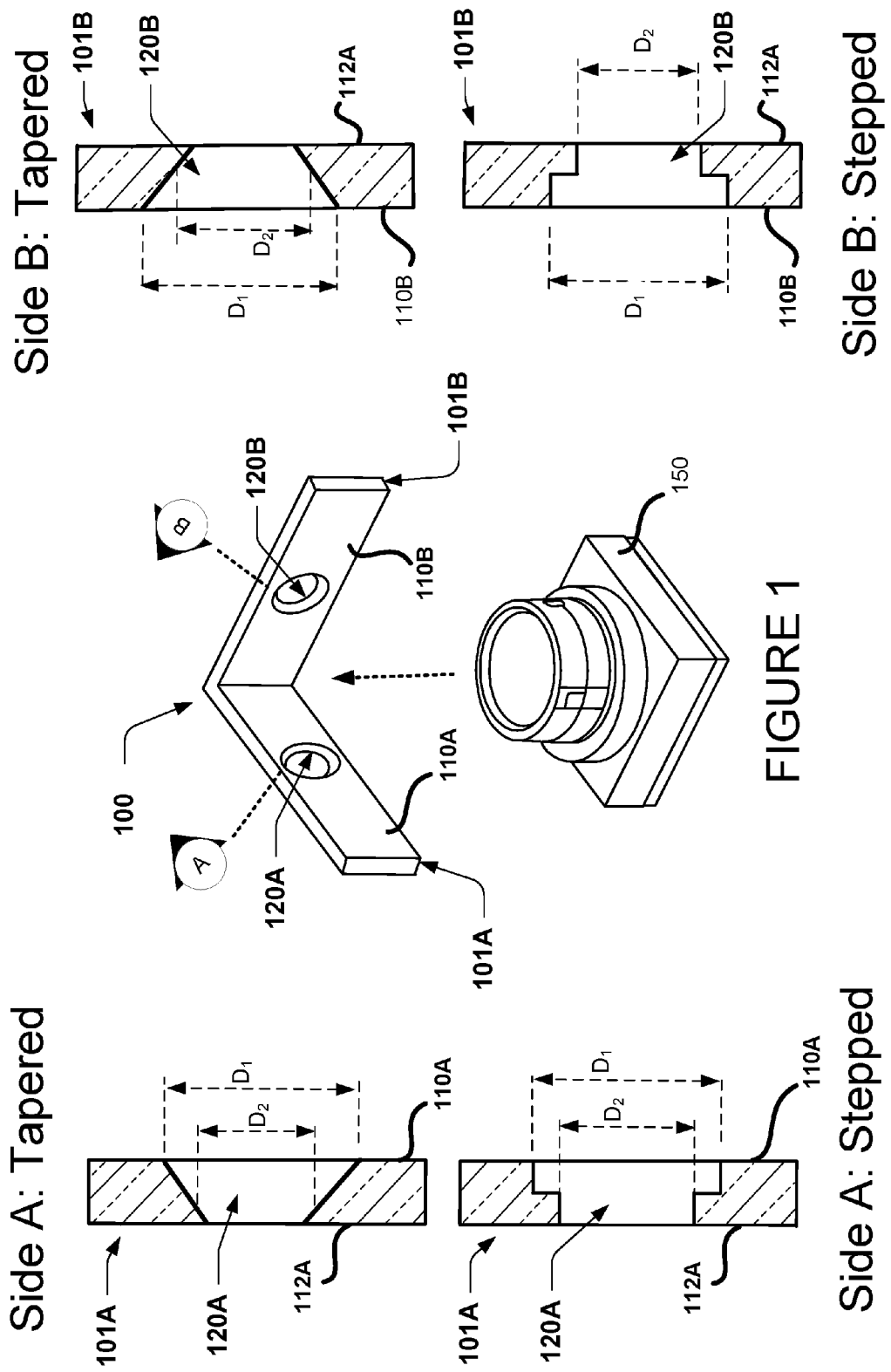
FIG. 1 is a perspective view of a mount and a number of cross-sections of components of the mount.

FIG. 1 is a perspective view of a mount 100 and several cross-sections of various sides 110 of the mount 100. The mount 100 comprises at least a first side 101A and a second side 101B. As shown by the dashed line between the mount 100 and the camera module 150, the camera module 150 can be moved in a position to make contact with a first inner surface 110A of the first side 101A and a second inner surface 110B the second side 101B. The first inner surface 110A of the first side 101A is configured to receive a first portion of the camera module 150 such that the first portion of the camera module 150 is in contact with the first inner surface 110A. The second inner surface 110B of the second side 101B is configured to receive a second portion of the camera module 150 such that the second portion of the camera module 150 is in contact with the second inner surface 110B.

In this illustrative example, to enable a suitable level of physical contact between the mount 100 and the camera module 150, the first inner surface 110A, the first portion of the camera module 150, the second inner surface 110B, and the second portion of the camera module 150 can be in coordinated shapes. In this example, they are all flat surfaces. In this example, the camera module 150 forms a square around its parameter. To accommodate the right angle between the two portions of the camera module 150 in contact with the mount 100, the first inner surface 110A is perpendicular to the second inner surface 110B.

Although this example includes flat surfaces, it can be appreciated that the mount 100 and the camera module 150 can be in any suitable shape for creating a mechanical connection, e.g., contact, between the surfaces 110 of the mount 100 and portions of the camera module 150. In addition, the angle between the first inner surface 110A and the second inner surface 110B can be at any angle to accommodate the shape of a camera module 150.

As described herein, the openings 120 within the mount 100 enable the use of a fastening material to secure the camera module 150 to at least one surface 110 of the mount 100 while allowing the camera module 150 and at least one surface 110 of the mount 100 to maintain contact with one another.

In this illustrative example, the first side 101A comprises a first opening 120A coupling a first inner surface 110A of the first side 101A and the first outer surface 112A of the first side 101A. The second side 101B comprises a second opening 120B coupling the second inner surface 110B of the second side 101B and a second outer surface 112B of the second side 101B. Although the example shown herein include openings 120 forming a circular shape, other shapes can be used. For example, the first opening 120A and the second opening 120B can form a square, rectangle, oval, a non-uniform shape, etc.

FIG. 1 also includes a number of cross-sections illustrating aspects of the openings 120 of the first side 101A and the second side 101B. Specifically, the cross-section in the upper-left corner of FIG. 1 illustrates an example configuration of the first opening 120A. As shown, the first opening has a first diameter ($D_1$) at the first inner surface and a second diameter ($D_2$) at a position between the first inner surface 110A and the first outer surface 112A. In this example, the first diameter ($D_1$) is greater than the second diameter ($D_2$). As shown, to achieve the transition from the first diameter ($D_1$) to the second diameter (D2), the first opening 120A is in a tapered configuration.

The cross-section in the lower-left corner of FIG. 1 illustrates another example configuration of the first opening 120A. This configuration also includes a first diameter (D1) at the first inner surface and a second diameter ($D_2$) at a position between the first inner surface 110A and the first outer surface 112A. In this example, the first diameter ($D_1$) is greater than the second diameter ($D_2$). As shown, to achieve the transition from the first diameter ($D_1$) to the second diameter ($D_2$), the first opening 120A is in a stepped configuration. Although only one step is shown, configurations can include multiple steps.

The cross-section in the upper-right corner of FIG. 1 illustrates an example configuration of the second opening 120B. In this example, the second opening 120B has a first diameter ($D_1$) at the first inner surface and a second diameter ($D_2$) at a position between the second inner surface 110B and the second outer surface 112B. In this example, the first diameter ($D_1$) is greater than the second diameter ($D_2$). In this example, the second opening 120B is in a tapered configuration.

The cross-section in the lower-right corner of FIG. 1 illustrates another example configuration of the second opening 120B. In this example, the second opening 120B has a first diameter ($D_1$) at the first inner surface and a second diameter ($D_2$) at a position between the second inner surface 110B and the second outer surface 112B. In this example, the first diameter ($D_1$) is greater than the second diameter ($D_2$). In this example, the second opening 120B is in a stepped configuration.

Although these examples refer to a diameter to indicate the size of an opening at a particular position, in configurations where the openings 120 are in other shapes, references to a diameter of an opening can also mean a distance ($D_1$ or $D_2$) from one side of an opening to another side of the opening. In addition to being at a position between an inner surface 110 and an outer surface 112, the second diameter ($D_2$) can also be positioned at an outer surface 112 of a side 110.

As will be described in more detail below, the openings 120 are configured to receive a fastening material. The openings 120 are configured to enable the fastening material to secure the camera module 150 the mount 100 while at least a portion of the camera module 150 is in physical contact with at least one surface of the mount 100. In some configurations, the openings are configured such that a contraction of a fastening material positioned within an opening 120 causes the fastening material to pull a portion of the camera module 150 toward at least one surface of the mount 100. In addition, in some configurations, the openings 120 are configured to allow a device to apply the fastening material to an opening 120 from the first outer surfaces 112. Although this illustrative example includes one opening per side, it can be appreciated that each side can include any suitable number of openings. Additionally, suitably designed jigs can be used to hold the camera module 150 in place during curing to ensure contact to at least one surface of the mount 100.

Figure 2:
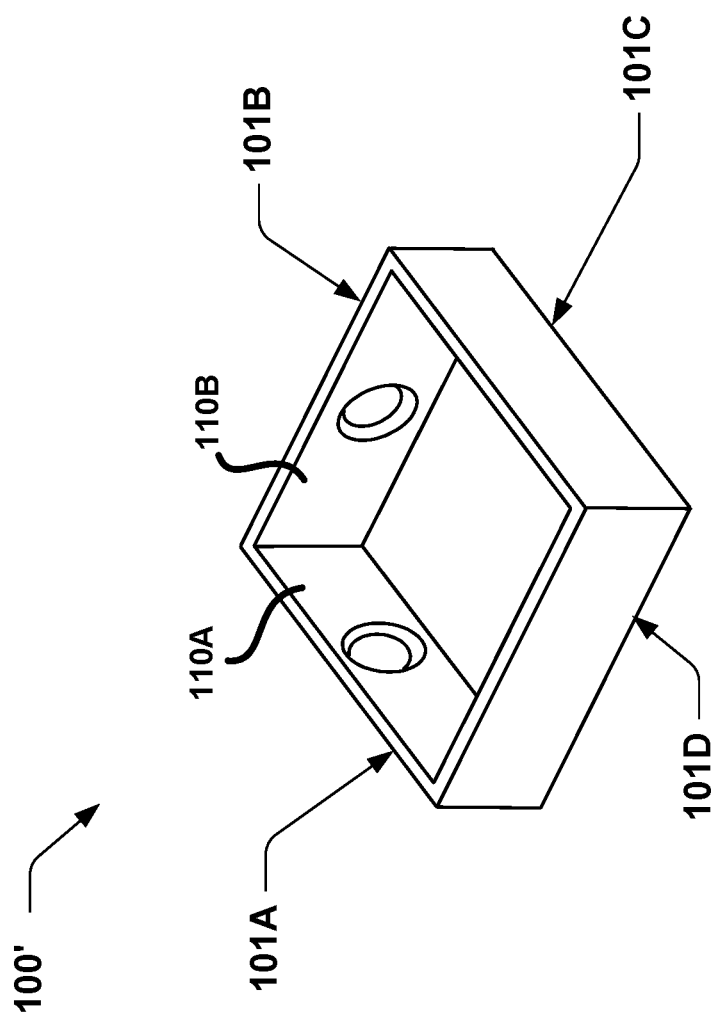
FIG. 2 is a perspective view of a mount having four sides.

FIG. 2 illustrates another example of a mount 100' configured according to the techniques disclosed herein. In this example, the mount 100' comprises a first side 101A and a second side 101B. The first side 101A, the second side 101B, and the openings 120 are configured in accordance with the present disclosure. In this example, the mount 100' also comprises a third side 101C and a fourth side 101D. In some configurations, the third side 101C is parallel to the first side 101A and the fourth side 101D is parallel to the second side 101B.

FIG. 3A and FIG. 3B illustrate other aspects of the mount 100' shown in FIG. 2. As shown, when the camera module 150 is positioned to make contact with the first inner surface 110A and the second inner surface 110B, the third side 101C is positioned at a distance from the first side 101A to provide a tolerance gap 301A between the third side 101C and at least a portion of the camera module 150. The fourth side 101D is positioned at a distance from the second side 101B to provide a tolerance gap 301B between the fourth side 101D and at least another portion of the camera module 150. The tolerance gaps 301 can be any suitable distance. In some configurations, a tolerance gap 301 is greater than a horizontal thermal expansion distance of the camera module 150.

Figure 4:
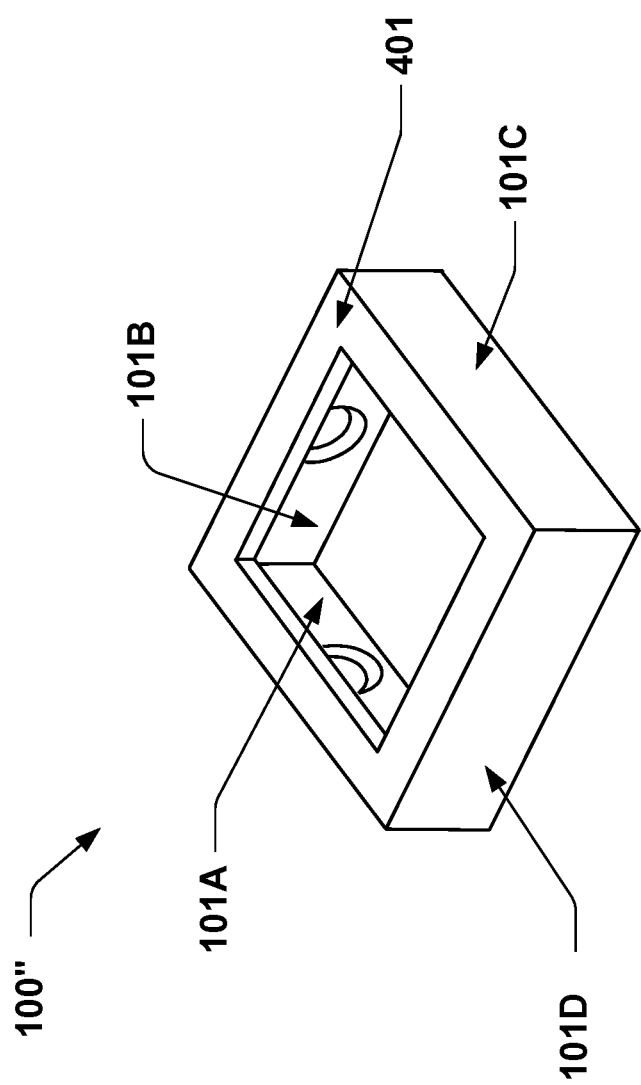
FIG. 4 is a perspective view of a mount having four sides and a top portion.

FIG. 4 illustrates another example of a mount 100" configured according to the techniques disclosed herein. In this example, in addition to comprising four sides 101A-101D, which are configured in a manner described herein, the mount 100" comprises a top portion 401. The top portion 401 can be formed at the top edge of at least one side, and the top portion 401 can form a plane that is perpendicular at least one side.

Figure 5:
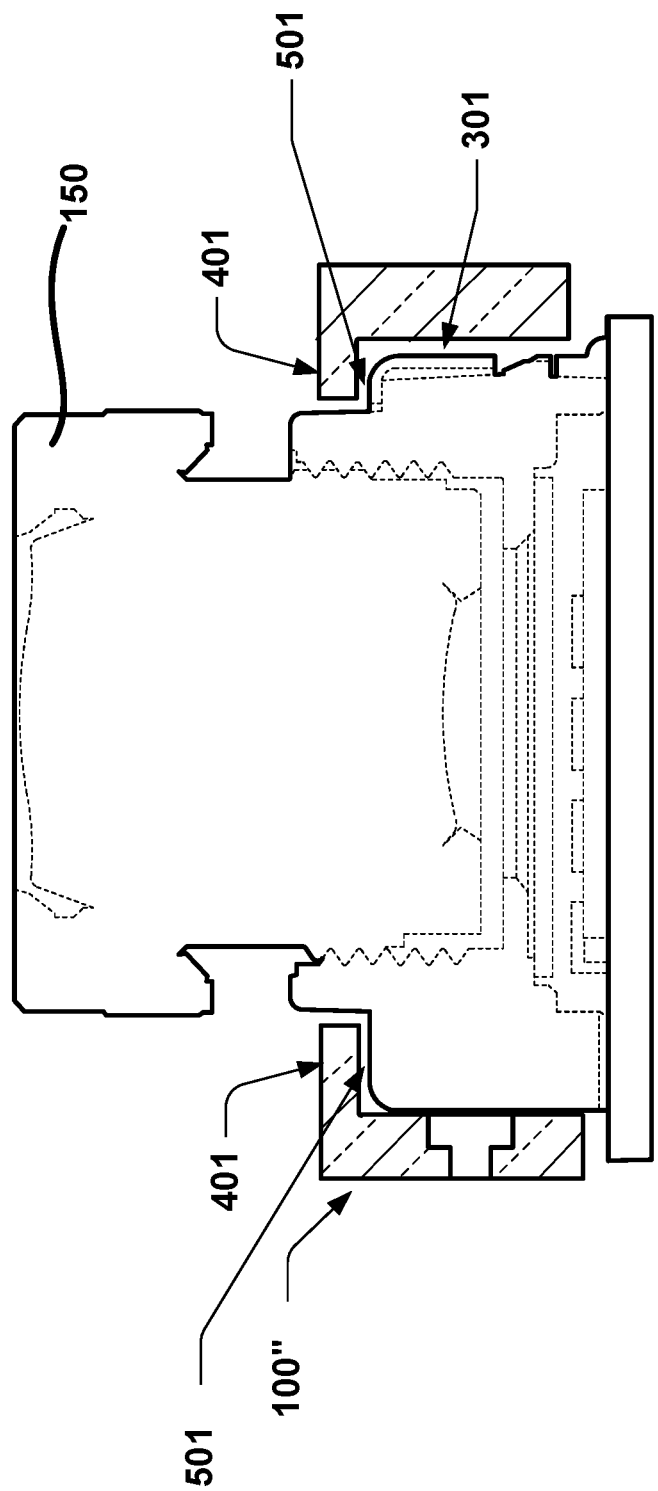
FIG. 5 is a cross-section of a mount having a top portion and a camera module positioned therein.

FIG. 5 illustrates other aspects of the mount 100" shown in FIG. 4. In some configurations, the mount 100" is configured such that, when the camera module 150 is positioned to make contact with the first inner surface 110A and the second inner surface 110B, the top portion 401 is positioned to provide a tolerance gap 501 between camera module 150 and the top portion 401. The tolerance gaps 501 can be any suitable distance. In some configurations, a tolerance gap 501 is greater than a vertical thermal expansion distance of the camera module 150. As also shown, one or more sides of the mount 100" can be positioned to form a tolerance gap 301 between the side of the camera module 150 and a side of the mount 100".

Figure 6:
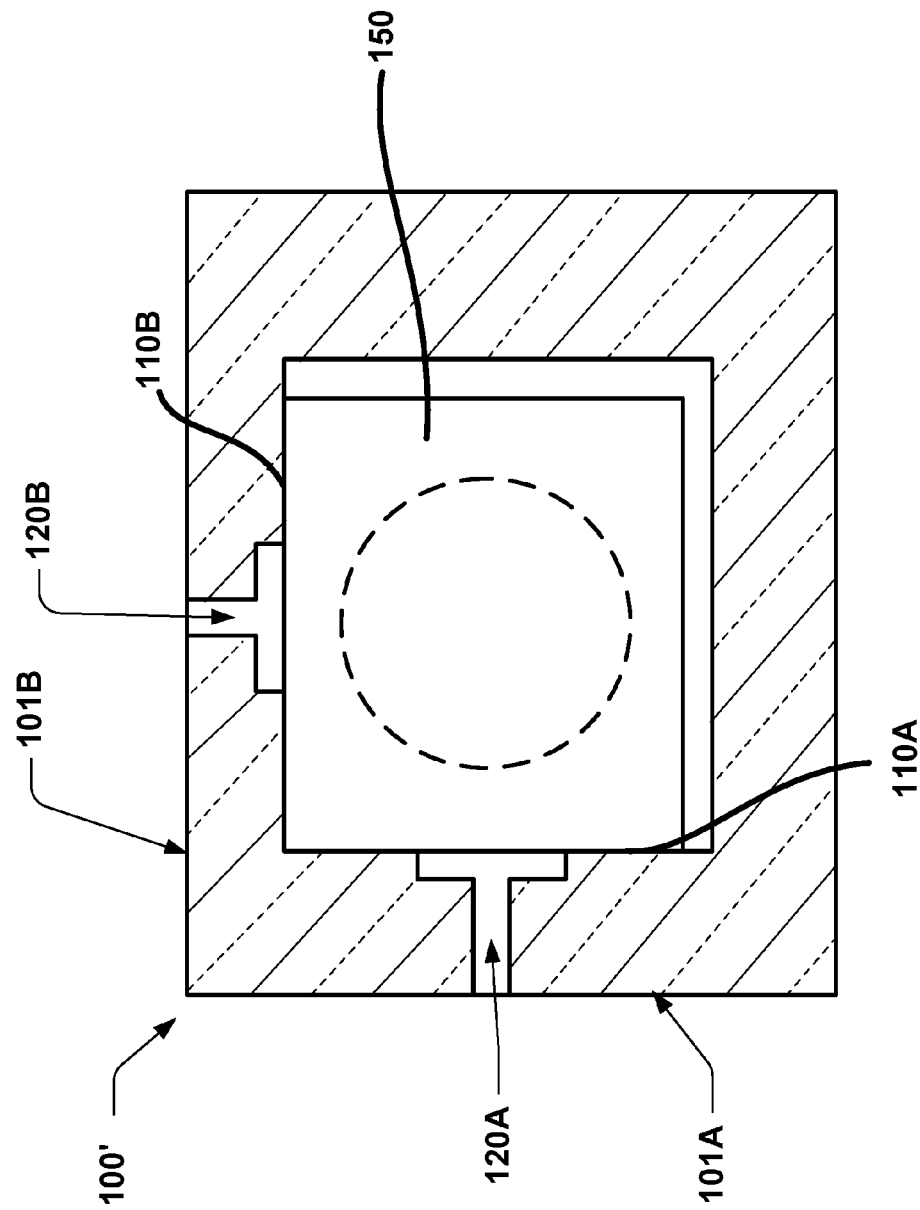

Referring now to FIG. 6 and FIG. 7, aspects of a process for securing a camera module 150 to a mount 100' are shown and described below. A shown in FIG. 6, the camera module 150 is positioned to make contact with a first inner surface 110A of the first side 101A and a second inner surface 110B the second side 101B. The first inner surface 110A of the first side 101A is configured to receive a first portion of the camera module 150 such that the first portion of the camera module 150 is in contact with the first inner surface 110A. The second inner surface 110B of the second side 101B is configured to receive a second portion of the camera module 150 such that the second portion of the camera module 150 is in contact with the second inner surface 110B.

As shown, the mount 100' is configured such that the third side 101C and the fourth side 101D respectively form a first tolerance gap 301A and a second tolerance gap 301B. In addition, the mount 100' is configured with a first opening 120A and a second opening 120B configured to enable the application of a fastening material to the camera module 150 and the mount 100'.

FIG. 7 illustrates a stage of the process after the fastening material 801 has been applied to the openings 120. In general, the fastening material 801 can be applied through each opening 120 to make contact with the camera module 150 and the mount 100'. The fastening material 801 can be any suitable material that fastens the camera module 150 to the mount 100'. In addition, in configurations where a fastening material 801 is configured to contract as it cures, the fastening material 801 can create a force to pull the camera module 150 toward each surface 110.

The fastening material 801 can include any suitable material for fastening a camera module 150 to components of any mount disclosed herein. For example, the fastening material 801 can comprise any suitable adhesive, such as an epoxy. Examples of other fastening materials can include, but are not limited to, acrylates, cyanoacrylates, phenol-formaldehyde, polyvinyl chlorides, silicones, and urethanes. These examples are provided for illustrative purposes and are not to be construed as limiting, as it can be appreciated that any suitable material, including a mechanical device, can be used to fasten a camera module 150 to components of a mount 100.

Figure 8A:
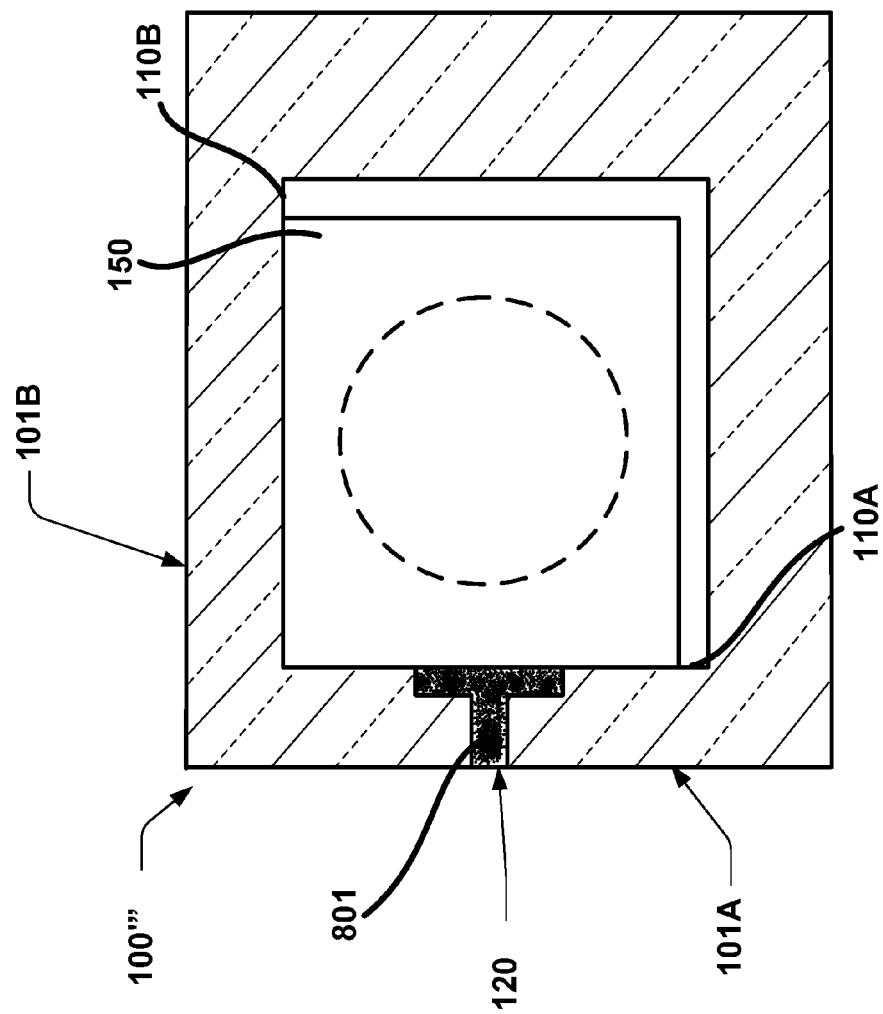
FIG. 8A is a cross-section of a mount having an opening configured to receive a fastening material for securing a camera module to the mount.

The configurations disclosed herein can include a mount having openings in one side. FIG. 8A illustrates one example of a mount 100''' having an opening 120 on the first side 101A of the mount 100''. In such a configuration, the camera module 150 can be held against the first surface 110A of the first side 101A while the fastening material 801 is applied to the opening 120. Similar to other examples disclosed herein, the fastening material 801 is applied such that the fastening material 801 makes contact with the opening 120 and at least a portion of the camera module 150.

Figure 8B:
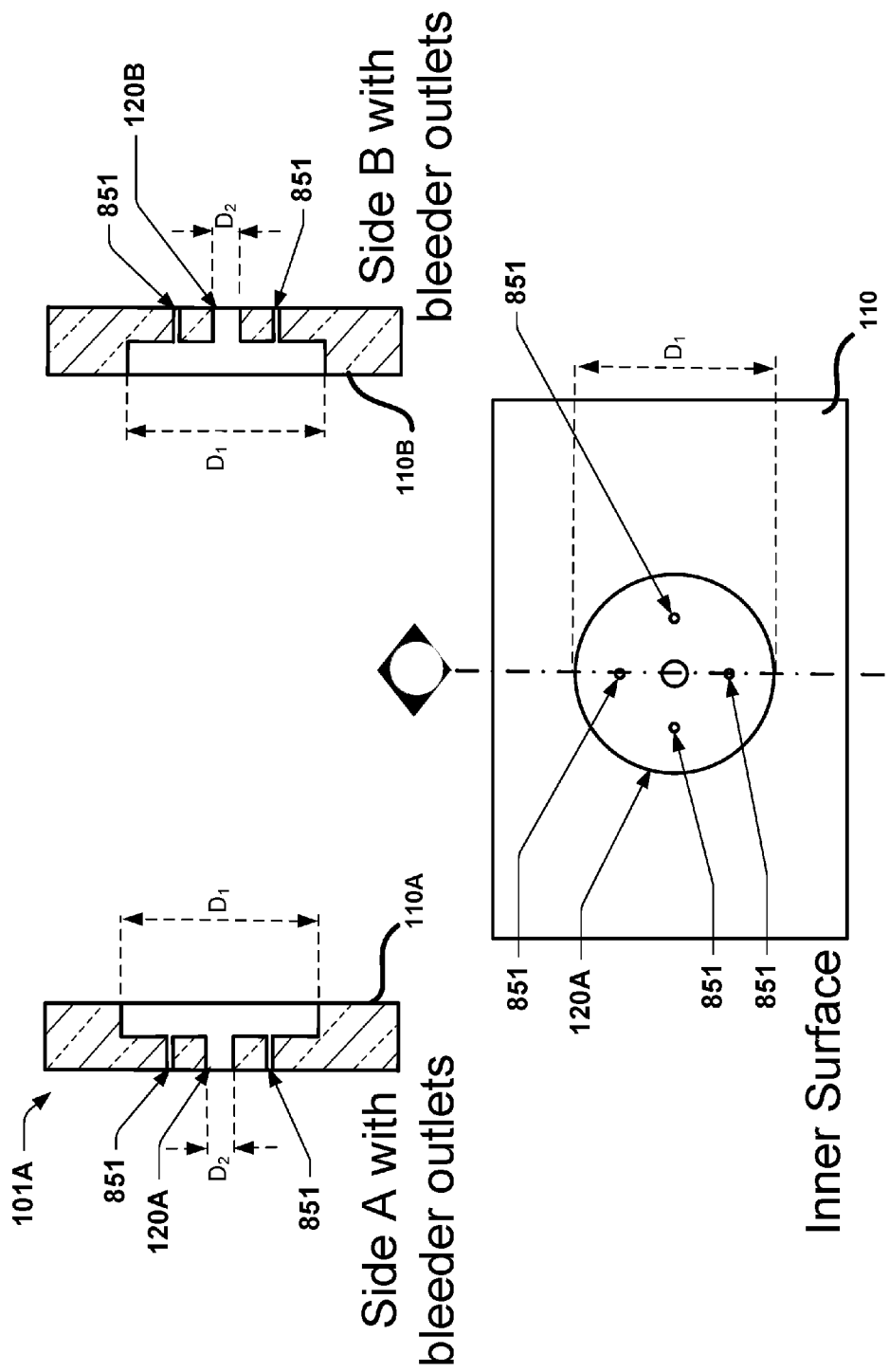
FIG. 8B is a front face of one side and cross-sections of two sides of a mount having openings configured with bleeder openings.
Figure 8C:
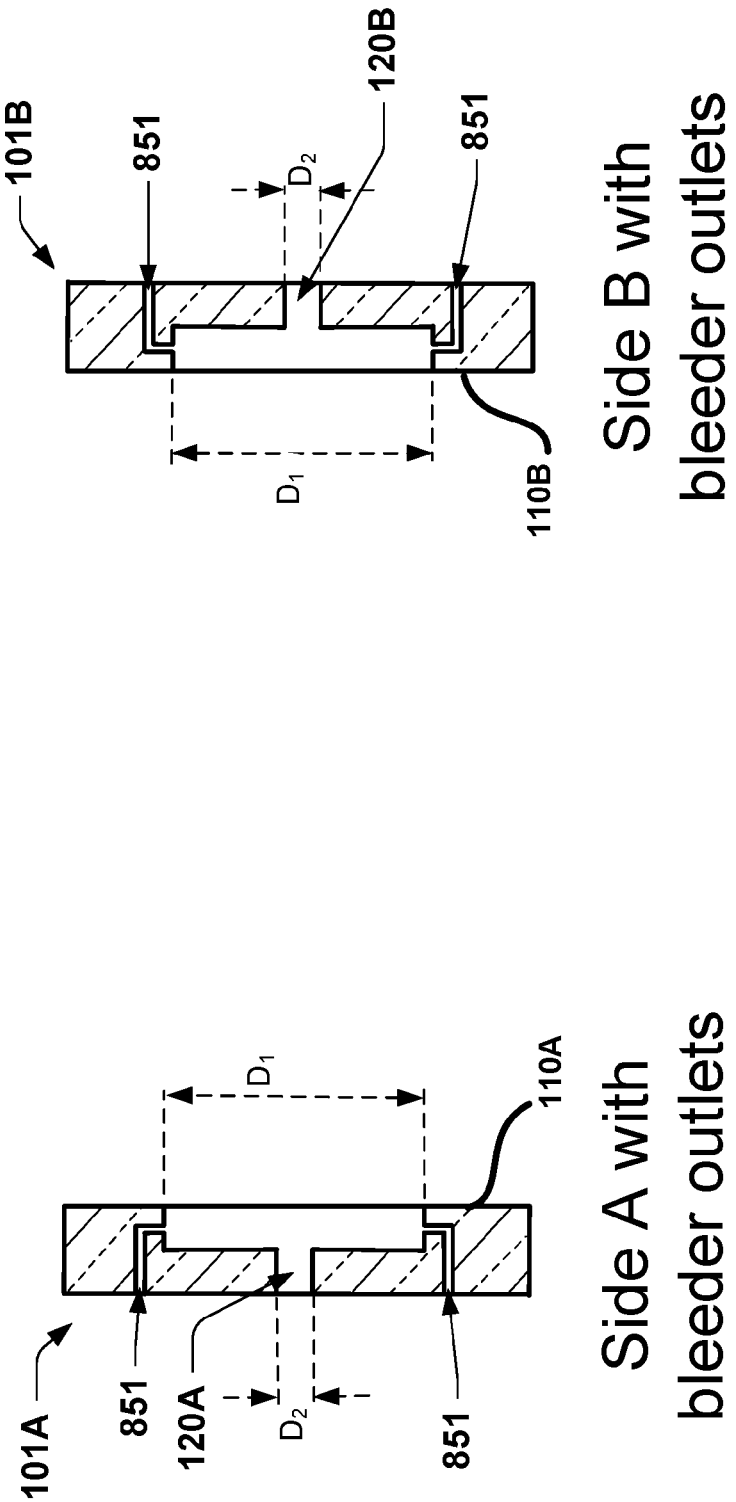
FIG. 8C includes cross-sections of another configuration of a mount having openings configured with bleeder openings.

The configurations disclosed herein can include a mount having openings with one or more bleeder openings. FIG. 8B and FIG. 8C illustrate examples of two sides 101 of a mount 100 having bleeder openings 851. As shown, the bleeder openings 851 can be sized and configured to allow air to escape while a fastening material 801 is applied to the opening 120. This example is provided for illustrative purposes and is not to be construed as limiting. It can be appreciated that the bleeder openings 851 can be in any suitable positions within the opening 120. Configurations disclosed herein can include any suitable number of bleeder openings 851.

As described above, configurations disclosed herein include openings 120 that are configured to enable a fastening material to pull a portion of a camera module 150 toward at least one surface of a mount 100. In some configurations, a sufficient preload is created by a fastening material 801 when it cures within an opening. For illustrative purposes, a fastening material 801 can have a first state, an uncured state, and a second state, a cured state. The fastening material 801 can also have a curing contraction coefficient, which can be measured by percentage of volume or by a distance. The curing contraction coefficient can also be referred to herein as a curing expansion coefficient. For instance, an adhesive can have a linear shrink of 5% during a curing process. In addition, while in the cured state, the fastening material can have a Coefficient of Thermal Expansion (CTE), also referred to herein as a thermal expansion coefficient.

Referring to FIG. 8D, additional aspects of the mechanics between the mount 100, the fastening material 801, and the camera module 150 are shown and described below. In general, the amount of force pulling the camera module 150 toward the mount 100 can depend on a number of factors. For instance, the force can depend on the volume of an opening 120, a depth ($D_3$) of the opening, a CTE of a fastening material 801, a CTE of the mount 100, a CTE of the camera module 150, and/or a curing contraction coefficient of the fastening material. For illustrative purposes, the depth ($D_3$) can measure from the datum surface to the top surface of the mount 100. In one illustrative example, consider a configuration including a mount 100 made of aluminum, having a CTE of 20 ppm/C, and a fastening material having a CTE of 80 ppm/C. In this example, the fastening material 801 has a linear shrink of 5% during a curing process. Also, in this example, the depth of the ($D_3$) of the opening is 0.5 mm.

In some configurations, when the camera module 150 is in operation, the temperature rises thus causing the mount 100 and the fastening material 801 to grow in size. In the current example, as shown in FIG. 8D, the aluminum mount will expand up by 20 ppm/C, and the adhesive will expand up by 80 ppm/C. At these expanded levels, the top surfaces of the fastening material 801 and the mount 100 will have a delta motion of 60 ppm/C. Thus, during a 10 degree heating process, the top surface of the fastening material 801 relative to the top surface of the mount 100 will move by 600 ppm. With a fastening material 801 having a linear shrink of 5%, the shrink during the curing process is 25 micrometers. With the parameters of such an example, when the fastening material 801 is in sufficient contact with the camera module 150 and the mount 100 and the fastening material 801 is in a cured state, even with a variation in the temperature, the fastening material 801 pulls the camera module 150 toward at least one mount 100 surface. This examples provided for illustrative purposes and is not to be construed as limiting.

Figure 9:
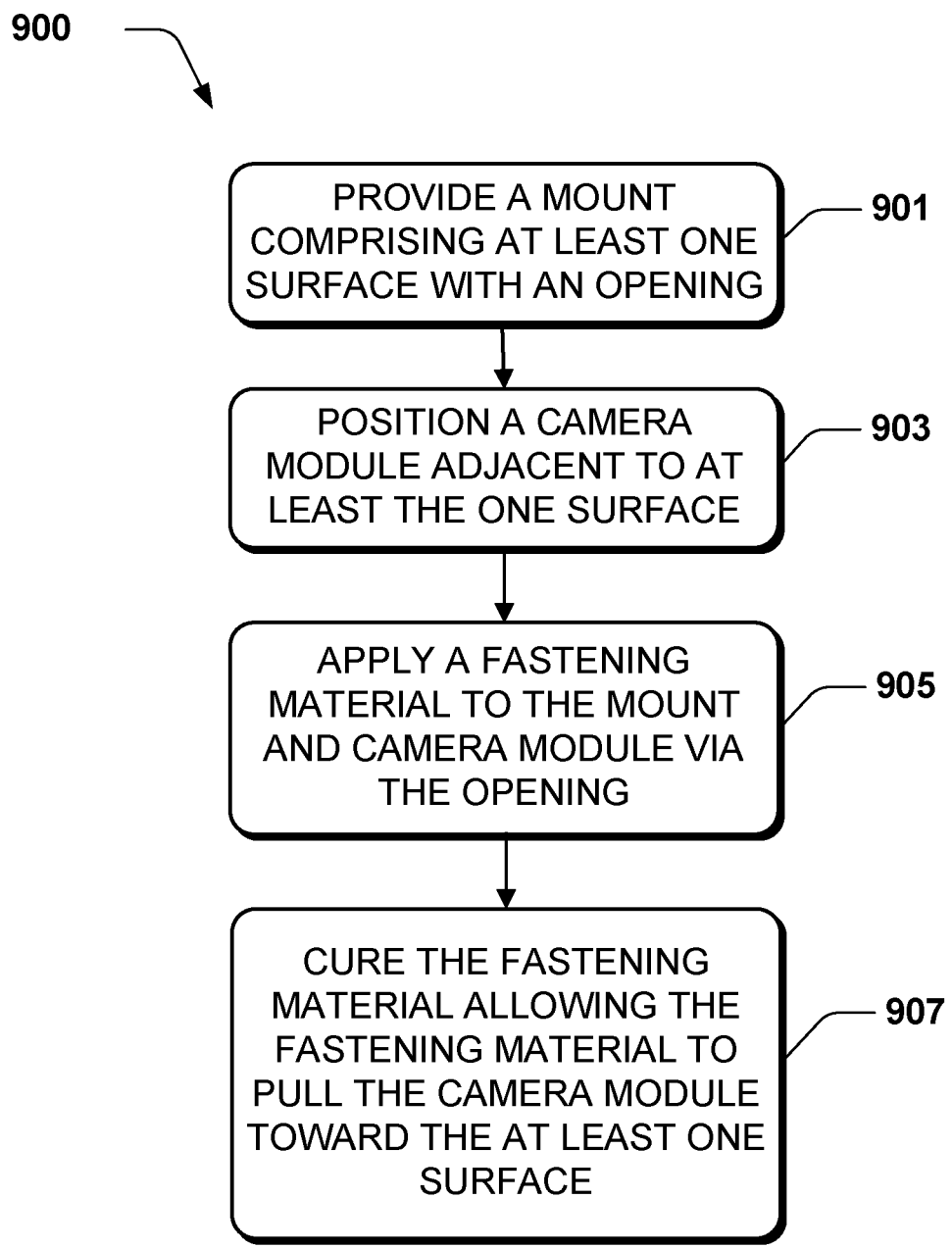
FIG. 9 is a flow diagram of a process for securing a camera module to a mount.

Referring now to FIG. 9, aspects of an example process 900 for fastening a mount 100 to a camera module 150 are shown and described below. The process 900 starts at stage 901 where a mount 100 comprising at least one inner surface 110 having an opening 120 is provided. Any configuration of a mount 100 described herein can be provided, including a mount 100 having at least two sides, a mount 100' having four sides, a mount 100'' having four sides and a top portion, or a mount 100''' having opening(s) in one side.

Next, at stage 903, the camera module 150 is positioned such that at least one portion of the camera module 150 is adjacent, e.g., making physical contact, with at least one inner surface 110 of the mount 100. In some configurations, when the mount 100 include at least two sides, the camera module 150 is positioned such that a first portion of the camera module 150 is in contact with the first inner surface 110A and a second portion of the camera module is in contact with the second inner surface 110B.

Next, at stage 905, the fastening material 801 is applied to the mount 100 and the camera module 150. In some configurations, the camera module 150 is held in position while the fastening material 801 is applied to the camera module 150 and the mount 100 through each opening 120. In configurations where bleeder openings 851 are utilized, stage 905 can involve a process where the fastening material 801 is applied to the opening 120 until a predetermined amount of the fastening material 801 exits the bleeder openings 851. Having a suitable amount of fastening material 801 exit the bleeder openings 851 helps ensure that the openings 120 are properly filled.

Next, at stage 907, the fastening material 801 is cured. In some configurations, a fastening material 801 can be self-curing, requiring a predetermined amount of time for this stage. In other applications, heat and/or light can be applied to the fastening material 801. Given the techniques disclosed herein, during the curing process, the fastening material 801 can contract to create a force pulling the camera module 150 toward the inner surface(s) 110 of the mount 100.

Based on the foregoing, it should be appreciated that concepts and technologies have been disclosed herein that provide an enhanced lens assembly. Although the subject matter presented herein has been described in language specific to some structural features, methodological and transformative acts, and specific machinery, it is to be understood that the invention defined in the appended claims is not necessarily limited to the specific features or acts described herein. Rather, the specific features and acts are disclosed as example forms of implementing the claims.

The subject matter described above is provided by way of illustration only and should not be construed as limiting. Various modifications and changes may be made to the subject matter described herein without following the example configurations and applications illustrated and described, and without departing from the true spirit and scope of the present invention, which is set forth in the following claims.

What is claimed is:

1. A mount for a camera module, comprising:
    a first side comprising a first opening coupling a first inner surface of the first side and a first outer surface of the first side, wherein the first inner surface is configured to receive a first portion of the camera module to enable contact between the first portion of the camera module and the first inner surface, and wherein the first opening is configured to receive a fastening material from the first outer surface;
    a second side comprising a second opening coupling a second inner surface of the second side and a second outer surface of the second side, wherein the second inner surface is configured to receive a second portion of the camera module to enable contact between the second portion of the camera and the second inner surface, and wherein the second opening is configured to receive the fastening material from the second outer surface; and
    a third side positioned that is substantially parallel to the first side, wherein the third side is positioned at a distance from the first side to provide a tolerance gap between a surface of the third side and at least a portion of the camera module, wherein the tolerance gap is greater than a thermal expansion distance of the camera module.

2. The mount of claim 1, wherein the first opening comprises a first diameter positioned at the first inner surface and a second diameter at a position between the first inner surface and the first outer surface, wherein the first diameter is greater than the second diameter.

3. The mount of claim 2, wherein the first opening transitions from the first inner surface to the first outer surface in a tapered configuration.

4. The mount of claim 2, wherein the first opening transitions from the first inner surface to the first outer surface in a stepped configuration.

5. The mount of claim 1, wherein the second opening comprises a first diameter at the second inner surface and a second diameter at a position between the second inner surface and the second outer surface, wherein the first diameter is greater than the second diameter.

6. The mount of claim 5, wherein the second opening transitions from the second inner surface to the second outer surface in a tapered configuration.

7. The mount of claim 5, wherein the second opening transitions from the second inner surface to the second outer surface in a stepped configuration.

8. The mount of claim 1, wherein the fastening material fastens the first portion of the camera module to the first inner surface, wherein the fastening material fastens the second portion of the camera module to the second inner surface, and wherein the fastening material comprises at least of an epoxy, an acrylate, a cyanoacrylate, a phenol-formaldehyde, a polyvinyl chloride, a silicone, or a urethane.

9. The mount of claim 1, wherein the mount comprises a top portion that is positioned to provide a tolerance gap between the top portion and at least a portion of the camera module.

10. The mount of claim 1, wherein the fastening material fastens the first portion of the camera module to the first inner surface, and wherein the first opening is configured such that a contraction of the fastening material pulls the first portion of the camera module toward the first inner surface.

11. The mount of claim 1, wherein the fastening material fastens the second portion of the camera module to the second inner surface, wherein the second opening is configured such that a contraction of the fastening material pulls the second portion of the camera module toward the second inner surface.

12. A method for fastening a camera module to a mount, the method comprising:
    providing a mount comprising at least one side having an opening coupling a first surface of the at least one side and a second surface of the at least one side, wherein the first surface is configured to receive a portion of the camera module enabling the portion of the camera module to be in contact with the first surface, and wherein the opening is configured to receive a fastening material from the second surface, wherein the opening has a first diameter at the first surface, and a second diameter at a position between the first surface and the second surface, wherein the mount comprises a side positioned substantially parallel to the at least one side, wherein the side is positioned at a distance from the at least one side to provide a tolerance gap between a surface of the side and at least another portion of the camera module, wherein the tolerance gap is greater than a thermal expansion distance of the camera module;
    positioning the camera module such that the portion of the camera module is in contact with the first surface; and
    applying the fastening material to the opening, wherein the application of the fastening material causes the fastening material to fasten the portion of the camera module to at least a portion of the opening.

13. The method of claim 12, wherein the fastening material is applied to the camera module and the portion of the opening through the opening at the second surface.

14. The method of claim 12, wherein the fastening material comprises at least of an epoxy, an acrylate, a cyanoacrylate, a phenol-formaldehyde, a polyvinyl chloride, a silicone, or a urethane.

15. The method of claim 12, wherein the method further comprises curing the fastening material causing the fastenings material to contract and pull the portion of the camera module toward at least the portion of the opening.

16. A mount, comprising at least one side having an opening coupling a first surface of the at least one side and a second surface of the at least one side, wherein the first surface is configured to receive a portion of the camera module to enable contact between the portion of the camera module and the first surface, and wherein the opening is configured to receive a fastening material from the second surface, wherein the opening has a first diameter at the first surface and a second diameter at a position between the first surface and the second surface, and wherein the first diameter is greater than the second diameter, wherein the mount comprises a side positioned substantially parallel to the at least one side, wherein the side is positioned at a distance from the at least one side to provide a tolerance gap between a surface of the side and at least another portion of the camera module, wherein the tolerance gap is greater than a thermal expansion distance of the camera module.

17. The mount of claim 16, wherein the fastening material fastens the portion of the camera module to the first inner surface, and wherein the first opening is configured such that a contraction of the fastening material pulls the first portion of the camera module toward the first inner surface.

18. The mount of claim 16, wherein the fastening material fastens the portion of the camera module to the first inner surface, wherein the fastening material comprises at least of an epoxy, an acrylate, a cyanoacrylate, a phenol-formaldehyde, a polyvinyl chloride, a silicone, or a urethane.

* * * * *